(12) United States Patent
Kiefl et al.

(10) Patent No.: US 10,613,013 B2
(45) Date of Patent: Apr. 7, 2020

(54) SENSOR FOR A MOTOR VEHICLE

(71) Applicant: Continental Automotive GmbH, Hannover (DE)

(72) Inventors: Christian Kiefl, Münster (DE); Jörg Friedel, Wenzenbach/Grünthal (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/073,956

(22) PCT Filed: Jan. 26, 2017

(86) PCT No.: PCT/EP2017/051655
§ 371 (c)(1),
(2) Date: Jul. 30, 2018

(87) PCT Pub. No.: WO2017/129684
PCT Pub. Date: Aug. 3, 2017

(65) Prior Publication Data
US 2019/0064045 A1 Feb. 28, 2019

(30) Foreign Application Priority Data
Jan. 29, 2016 (DE) .................. 10 2016 201 343

(51) Int. Cl.
*G01R 27/26* (2006.01)
*G01N 15/06* (2006.01)
*G01N 15/00* (2006.01)

(52) U.S. Cl.
CPC . *G01N 15/0656* (2013.01); *G01N 2015/0046* (2013.01)

(58) Field of Classification Search
CPC combination set(s) only.
See application file for complete search history.

(56) References Cited

U.S. PATENT DOCUMENTS

| 9,053,912 B2 | 6/2015 | Kokubo | |
|---|---|---|---|
| 2011/0062973 A1 | 3/2011 | Paterson | 324/693 |
| 2011/0203259 A1* | 8/2011 | Upadhyay | F01N 3/208 60/274 |

(Continued)

FOREIGN PATENT DOCUMENTS

| CN | 202611820 U | 12/2012 | F01N 11/00 |
|---|---|---|---|
| DE | 102014208281 A1 | 11/2014 | F01N 11/00 |
| WO | 2017/129684 A1 | 8/1917 | G01N 15/06 |

OTHER PUBLICATIONS

German Office Action, Application No. 102016201343.2, 6 pages, dated Mar. 1, 2017.

(Continued)

*Primary Examiner* — Vincent Q Nguyen
(74) *Attorney, Agent, or Firm* — Slayden Grubert Beard PLLC

(57) ABSTRACT

Various embodiments may include a sensor for a motor vehicle including an anode conductor, an anode sleeve connected to the anode conductor, an adapter sleeve, a housing, a connection between the housing and the adapter sleeve, and a cathode sleeve connected to the housing. The anode conductor is rigidly connected to the adapter sleeve by an electrical insulator. The anode sleeve and the cathode sleeve are arranged coaxially with respect to one another within the scope of the production tolerances.

6 Claims, 5 Drawing Sheets

(56) References Cited

U.S. PATENT DOCUMENTS

| | | | |
|---|---|---|---|
| 2011/0225954 A1* | 9/2011 | Miyata | F01N 11/00 60/277 |
| 2011/0305259 A1* | 12/2011 | Wienand | G01K 7/183 374/185 |
| 2012/0110850 A1* | 5/2012 | Cantele | F01N 3/0211 29/890 |
| 2012/0234172 A1 | 9/2012 | Sugiyama et al. | 96/26 |
| 2012/0262182 A1 | 10/2012 | Matsuoka et al. | 324/464 |
| 2013/0219990 A1 | 8/2013 | Allmendinger et al. | 73/23.31 |
| 2018/0058361 A1* | 3/2018 | Di Miro | F01N 13/008 |

OTHER PUBLICATIONS

International Search Report and Written Opinion, Application No. PCT/EP2017/051665, 22 pages, dated May 22, 2017.

\* cited by examiner

SENSOR FOR A MOTOR VEHICLE

CROSS-REFERENCE TO RELATED APPLICATIONS

This application is a U.S. National Stage Application of International Application No. PCT/EP2017/051655 filed Jan. 26, 2017 which designates the United States of America, and claims priority to DE Application No. 10 2016 201 343.2 filed Jan. 29, 2016, the contents of which are hereby incorporated by reference in their entirety.

TECHNICAL FIELD

The present disclosure relates to motor vehicles. Various embodiments may include a sensor for a motor vehicle, in particular a capacitive exhaust gas sensor. The disclosure furthermore relates to a method for producing a sensor of this type.

BACKGROUND

In motor vehicles, a wide variety of sensors are used to detect parameters that are useful for the operation of the motor vehicle. By way of example, sensors are also used to determine the concentration of specific substances in the exhaust gas. It is desirable to specify a sensor for a motor vehicle which has a high accuracy. It is furthermore desirable to specify a method for producing a sensor for a motor vehicle which enables a sensor having high accuracy.

SUMMARY

Various embodiments of the teachings herein may include sensor (100) for a motor vehicle, comprising: an anode conductor (101), an anode sleeve (102), which is connected to the anode conductor (101), an adapter sleeve (103), wherein the anode conductor (101) is rigidly connected to the adapter sleeve (103) by means of an electrical insulator (104), a housing (105), a connection (106) that connects the housing (105) and the adapter sleeve (103) to one another, and a cathode sleeve (107), which is connected to the housing (105), wherein the anode sleeve (102) and the cathode sleeve (107) are arranged coaxially with respect to one another within the scope of the production tolerances.

In some embodiments, the connection that connects the housing (105) and the adapter sleeve (103) to one another is a welding connection.

In some embodiments, the adapter sleeve (103) together with the anode conductor (101) and the insulator (104) forms an assembly (108) which, during production, is connectable to the housing (105) formed separately therefrom.

In some embodiments, the adapter sleeve (103), the anode conductor (101) and the insulator (104) are connected to one another by means of a soldering connection.

In some embodiments, the adapter sleeve (103) is formed from a metal whose coefficient of thermal expansion corresponds to the coefficient of thermal expansion of the insulator (104) within a predefined range.

In some embodiments, the cathode sleeve (107) has, at an end (109) facing away from the housing (105), an internal diameter (111) that is greater than or equal to the external diameter (112) of the anode sleeve (102) at least in an end region (113) facing away from the housing (105).

As another example, some embodiments may include a method for producing a sensor (100) for a motor vehicle, comprising: providing an adapter sleeve (103), to which an anode conductor (101) is rigidly connected by means of an electrical insulator (104), providing respectively a housing (105), an anode sleeve (102) and a cathode sleeve (107), aligning the adapter sleeve (103) and the housing (105) relative to one another, such that the anode conductor (101) and the housing (105) are coaxial with respect to one another within the scope of the production tolerances, connecting the adapter sleeve (103) to the housing (105), connecting the anode sleeve (103) to the anode conductor (101), aligning the cathode sleeve (107) relative to the anode sleeve (102), such that the anode sleeve (102) and the cathode sleeve (107) are arranged coaxially with respect to one another within the scope of the production tolerances, and connecting the cathode sleeve (107) to the housing (105).

In some embodiments, connecting the adapter sleeve (103) to the housing (105) comprises: forming a welding connection that connects the adapter sleeve (103) and the housing (105) to one another.

In some embodiments, providing the adapter sleeve (103) comprises: aligning the anode conductor (101) and the adapter sleeve (103) coaxially with respect to one another within the scope of the production tolerances before the anode conductor (101) is rigidly connected to the adapter sleeve (103), and connecting the anode conductor (101) to the adapter sleeve (103) by means of soldering such that the anode conductor (101) and the adapter sleeve (103) are coaxial with respect to one another within the scope of the production tolerances.

In some embodiments, the method includes aligning the anode sleeve (102) and the housing (105) relative to one another, such that the anode sleeve (102) and the housing (105) are coaxial with respect to one another within the scope of the production tolerances before the anode sleeve (102) is connected to the anode conductor (101).

BRIEF DESCRIPTION OF THE DRAWINGS

Further advantages, features and developments are evident from the following examples which are explained below in association with the figures. Elements that are identical, of identical type and act identically may be provided with the same reference signs through the figures. In the figures.

DETAILED DESCRIPTION

Figure 1:
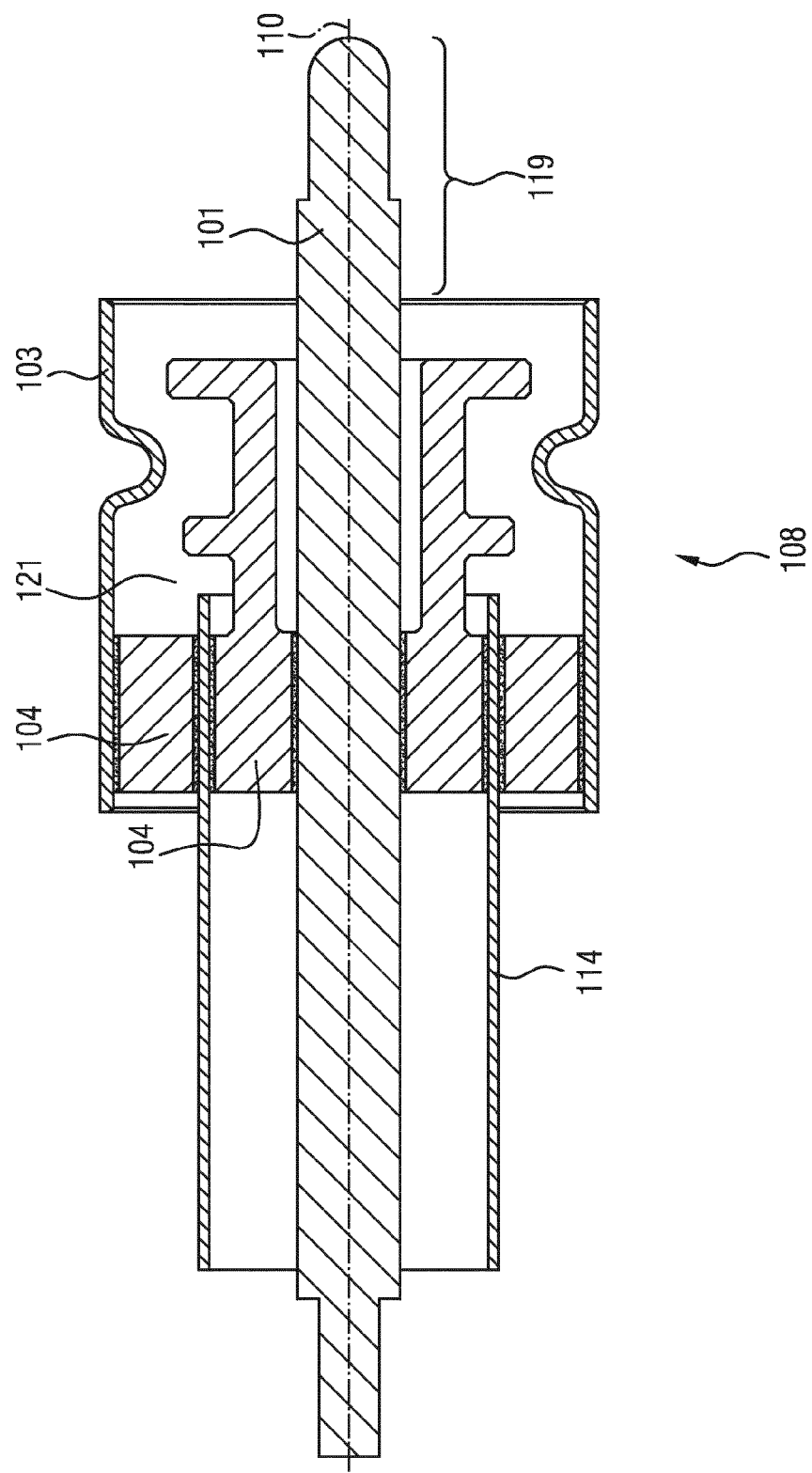
FIG. 1 shows a schematic sectional view of an assembly for a sensor in accordance with one embodiment.

In some embodiments, a sensor for a motor vehicle comprises an anode conductor and an anode sleeve, which is connected to the anode conductor. The sensor comprises an adapter sleeve, wherein the anode conductor is rigidly connected to the adapter sleeve by means of an electrical insulator. The sensor comprises a housing. The sensor comprises a connection that connects the housing and the adapter sleeve to one another. The sensor comprises a cathode sleeve which is connected to the housing. The anode sleeve and the cathode sleeve are arranged coaxially with respect to one another within the scope of the production tolerances.

In some embodiments, the sensor comprises a capacitive exhaust gas sensor. The sensor may detect soot particles and/or a concentration of soot particles in the exhaust gas. During operation, an electric field is generated between the anode sleeve and the cathode sleeve. The electric field is influenced when soot particles pass through, and thus generates a measurement signal that is dependent on the concentration of the soot particles in the exhaust gas flow.

The anode conductor, the anode sleeve, the adapter sleeve, the housing, and the cathode sleeve extend along a longitudinal axis. These components of the sensor may be aligned coaxially with respect to said longitudinal axis within the scope of the production tolerances. The components need not completely overlap along the longitudinal axis. In particular, coaxial in this context means that the components are concentric in a projection onto a plane transversely with respect to the longitudinal axis By virtue of the use of the adapter sleeve, to which the anode conductor is rigidly connected, the production tolerances when connecting the anode conductor to the surrounding element may be decoupled from the alignment of the anode sleeve with respect to the housing and/or the anode sleeve with respect to the cathode sleeve. The cathode sleeve is connected to the housing and is not directly connected to the adapter sleeve. Consequently, the components that are crucial for the alignment of the cathode sleeve relative to the anode sleeve are decoupled from one another at least during production. Consequently, it is possible for the anode sleeve and the cathode sleeve to be aligned as coaxially as possible with respect to one another over the entire length of the anode sleeve. Consequently, the sensor may have an exact and constant air gap between the anode sleeve and the cathode sleeve. Consequently, a high accuracy of the measurement signal may be possible. An excessively great deviation of the coaxiality can be avoided. Consequently, a capacitive sensor having a high resolution or accuracy is possible, which has in particular an accuracy that is at least just as good as that of a resistive sensor.

In some embodiments, the anode conductor and the insulator are connected to the adapter sleeve by means of a soldering connection. In particular, a hard soldering method may be used with temperatures of up to 950° C. for example. The adapter sleeve together with the anode conductor and the insulator forms an assembly which, during production, is connectable to the housing formed separately therefrom. Consequently, production tolerances that occur when connecting the anode conductor to the adapter sleeve can be compensated for again when the assembly is coupled to the housing. The alignment of the assembly, in particular of the anode conductor, relative to the housing is possible with significantly smaller production tolerances than occur during the hard soldering method for connecting the anode conductor to the adapter sleeve.

In some embodiments, the adapter sleeve is formed from a metal whose coefficient of thermal expansion corresponds to the coefficient of thermal expansion of the insulator within a predefined range. The insulator may comprise a ceramic or a glass, for example. Consequently, the adapter sleeve serves as a link between the housing and the insulator. The material of the adapter tube may be chosen with regard to the coefficient of thermal expansion so as to enable compensation between the coefficient of thermal expansion of the housing and the coefficient of thermal expansion of the insulator. Consequently, a reduced loading of the sensor is possible since temperature-governed stresses may be taken up by the adapter sleeve and compensated for.

In some embodiments, the cathode sleeve has, at an end facing away from the housing, an internal diameter that is greater than or equal to the external diameter of the anode sleeve at least in an end region facing away from the housing. Consequently, it is possible to realize the alignment of the cathode sleeve relative to the anode sleeve as accurately and as coaxially as possible even at the end facing away from the end and at the end region, for example by means of a gauge. The gauge aligns the internal diameter and the external diameter precisely relative to one another.

In some embodiments, a method for producing a sensor, in particular a sensor for a motor vehicle, comprises providing an adapter sleeve, to which an anode conductor is rigidly connected by means of an electrical insulator. Respectively a housing, an anode sleeve and a cathode sleeve are provided. The adapter sleeve and the housing are aligned relative to one another, such that the anode conductor and the housing are coaxial with respect to one another within the scope of the production tolerances. The adapter sleeve is connected to the housing. The anode sleeve is connected to the anode conductor. The cathode sleeve is aligned relatively to the anode sleeve, such that the anode sleeve and the cathode sleeve are arranged coaxially with respect to one another within the scope of the production tolerances. The cathode sleeve is connected to the housing.

The production method makes it possible to produce a sensor which, during operation, has a high accuracy of the measurement signal on account of an exact and constant air gap between anode sleeve and cathode sleeve. For this purpose, firstly the anode sleeve is rigidly connected to the anode conductor. This assembly is subsequently connected to the housing. The housing and the adapter sleeve are dimensioned such that a slight play between the adapter sleeve and the housing is possible when the adapter sleeve is inserted into the housing. Consequently, it is possible for the adapter sleeve and in particular the anode conductor to be exactly aligned relative to the housing. The cathode sleeve is subsequently connected to the housing. Consequently, an alignment of the cathode sleeve with respect to the anode sleeve that is as exact as possible is subsequently also made possible by the alignment of the anode conductor with respect to the housing. The housing, to which the cathode sleeve is connected, and the adapter sleeve, to which the anode sleeve is connected indirectly by means of the anode conductor, are initially separate components that are exactly aligned relative to one another and are subsequently connected to one another, for example by means of a welding process.

By way of example, for providing the adapter sleeve, the anode conductor and the adapter sleeve are aligned coaxially with respect to one another within the scope of the production tolerances and are subsequently connected to one another by means of soldering, in particular by means of a hard soldering method. The production tolerances that occur in this case can subsequently be compensated for by the alignment of the adapter sleeve relative to the housing. The production tolerances that occur during hard soldering are thus only of secondary importance in the overall system of the sensor.

Figure 5:
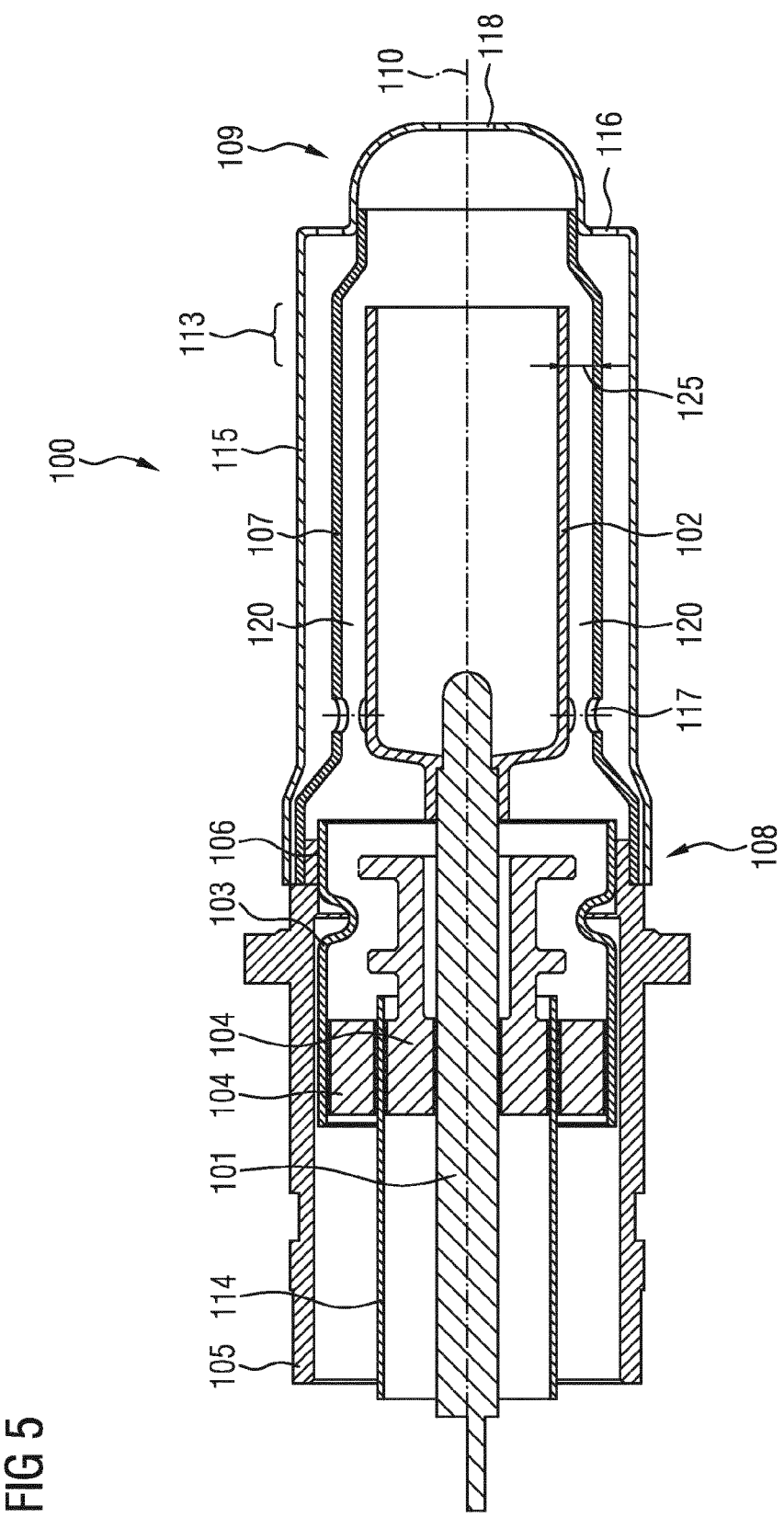
FIG. 5 shows a schematic illustration of a sectional view of the sensor of one embodiment.

In some embodiments, a sensor as explained above may be produced by means of the production method described. The features and advantages presented in connection with the sensor are also used in association with the production method, and vice versa. FIG. 1 shows a schematic illustration of a sectional view of an assembly 108. The assembly 108 is, in particular, a part for a sensor 100 (FIG. 5). The assembly 108 comprises an adapter sleeve 103. An anode conductor 101 is connected to the adapter sleeve. The anode conductor 101 is connected to the adapter sleeve 103 by means of an insulator 104. In addition, an inner sleeve 114 is provided, which is coupled to the insulator 104.

The adapter sleeve 103 and the anode conductor 101 each extend with an elongate extent along a longitudinal axis 110. In this case, the anode conductor 101 is configured such that it is longer than the adapter sleeve 103 and has, in particular, a region 119 that projects beyond the adapter sleeve 103 along the longitudinal axis 110. The adapter sleeve 103 may comprise a metal and surround an interior 121. The anode conductor 101 extends through the interior 121.

The insulator 104 may comprise a highly insulating material, for example a ceramic or a glass. By way of example, the insulator may be metalized on a corresponding surface for the purpose of connection to the adapter sleeve 103 and/or the anode conductor 101. For the purpose of connecting the anode conductor 101 to the insulator 104 and to the adapter sleeve 103, a hard soldering process may be carried out at temperatures of up to 950° C. In this case, the anode conductor 101 is held as coaxially as possible with respect to the anode conductor 103. After the hard soldering process, the anode conductor 101 and the adapter sleeve 103 are arranged coaxially with respect to the longitudinal axis 110 within the scope of the production tolerances. The assembly 108 comprises the ceramic components, in particular the insulator 104, the sensor 101, which are connected to the adapter sleeve 103 and respectively the anode conductor 101 with comparatively large production tolerances.

Figure 2:
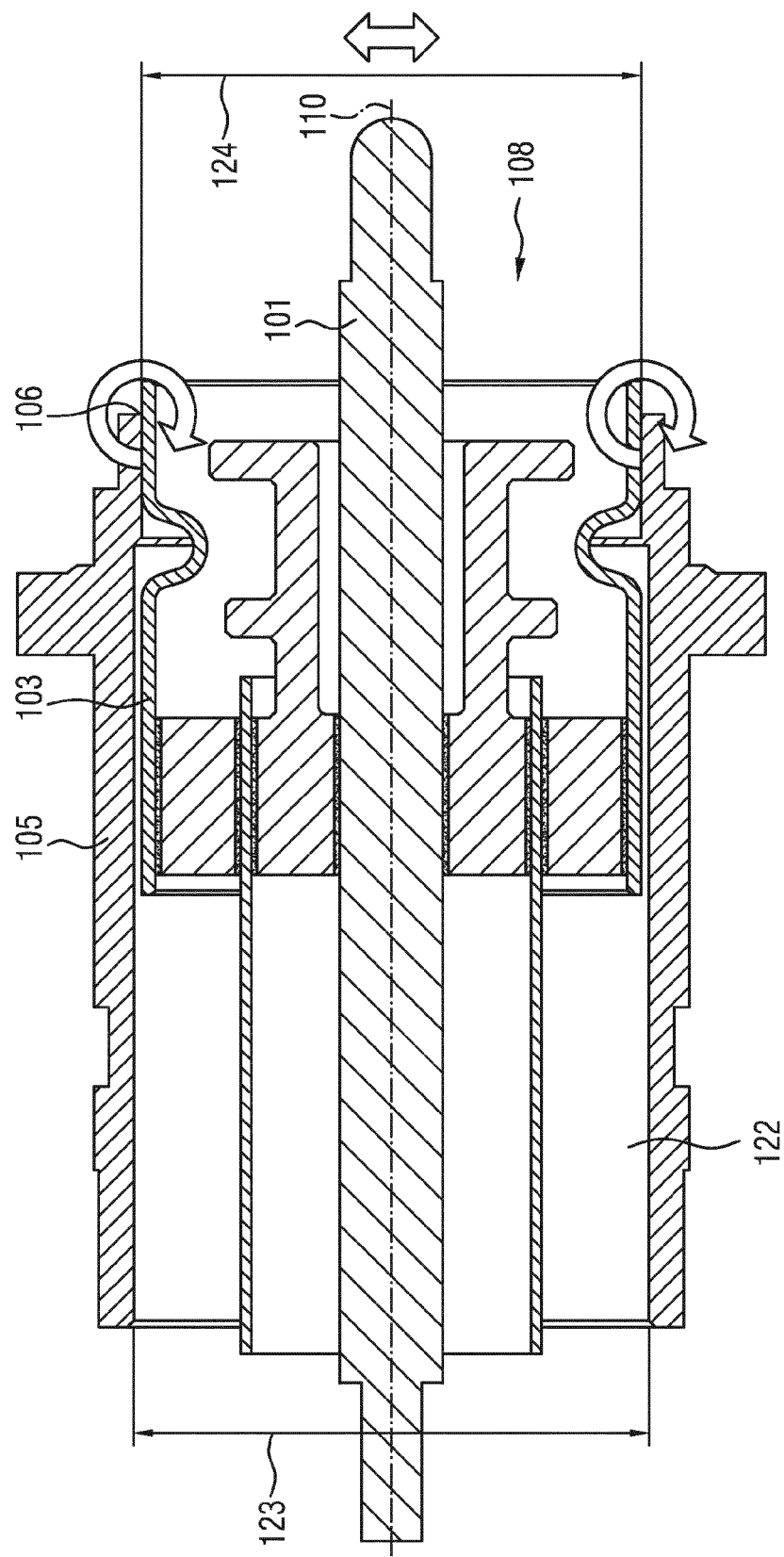
FIG. 2 shows a schematic sectional view of a part of the sensor during production in accordance with one embodiment.

FIG. 2 shows a schematic illustration of a part of the sensor 101 in a further step of the production method. The assembly 108 is inserted into a housing 105 of the sensor 100. The housing 105 surrounds a cavity 122. The housing 105 extends along the longitudinal axis 110, such that the adapter sleeve 103 can be at least partly inserted into the cavity 120.

The housing 105 has an internal diameter 123 at least in sections. The anode sleeve has an external diameter 124 at least in sections. The internal diameter 123 and the external diameter 124 are coordinated with one another such that the adapter sleeve 103 can be tilted relative to the housing 104 when the adapter sleeve 103 is arranged in the housing 104. By way of example, the internal diameter 123 is somewhat larger than the external diameter 124. The adapter sleeve 103 is arranged with a slight play in the housing 105. Consequently, the anode conductor 101, in particular the region 119 of the anode conductor 101, can be tilted transversely with respect to the longitudinal axis 110 and thus be aligned as coaxially as possible with respect to the housing 105. Deviations between the coaxial alignment between the anode conductor 101 and the adapter sleeve 103 that inevitably occur during production can thus be compensated for between anode conductor 101 and housing 105.

On account of the relative mobility between adapter sleeve 103 and housing 105, the anode conductor 101 is alignable as coaxially as possible with respect to the housing 105. The adapter sleeve 103 and the housing 105 are subsequently fixedly connected to one another by means of a connection 106, for example welded.

Figure 3:
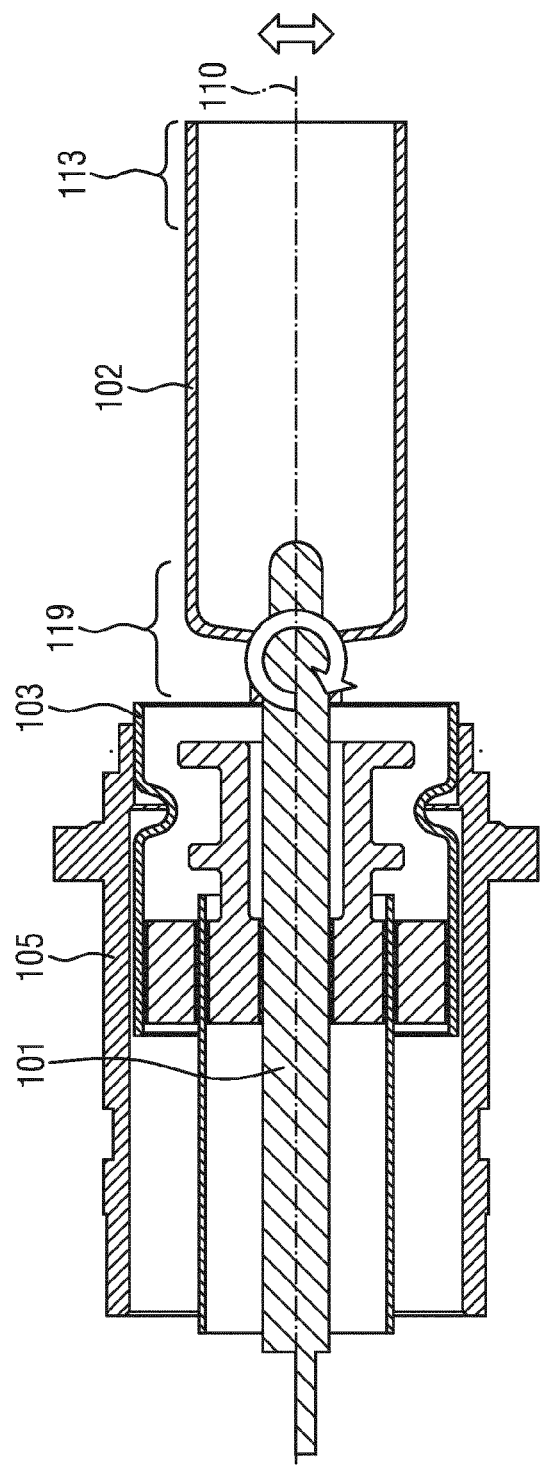
FIG. 3 shows a schematic illustration of a sectional view of a part of the sensor during the production of one embodiment.

FIG. 3 shows a schematic illustration of a part of the sensor 101 during a further step in the production method. An anode sleeve 102 is fitted onto the region 119 of the anode conductor 101. The anode sleeve 102 extends with an elongate extent along the longitudinal axis 110 and is formed from an electrically conductive material. Since the region 119 was aligned as coaxially as possible with respect to the housing 105 and serves as a receptacle for the anode sleeve 102, the anode sleeve 102 is also aligned as coaxially as possible with respect to the housing 105 at least in the region 119. In order to enable as good coaxiality as possible over the entire length of the anode sleeve 102 along the longitudinal axis 110, the anode sleeve 102 is aligned relative to the housing 105 even in the end region 113. The anode sleeve 102 is subsequently connected to the anode conductor 101.

Figure 4:
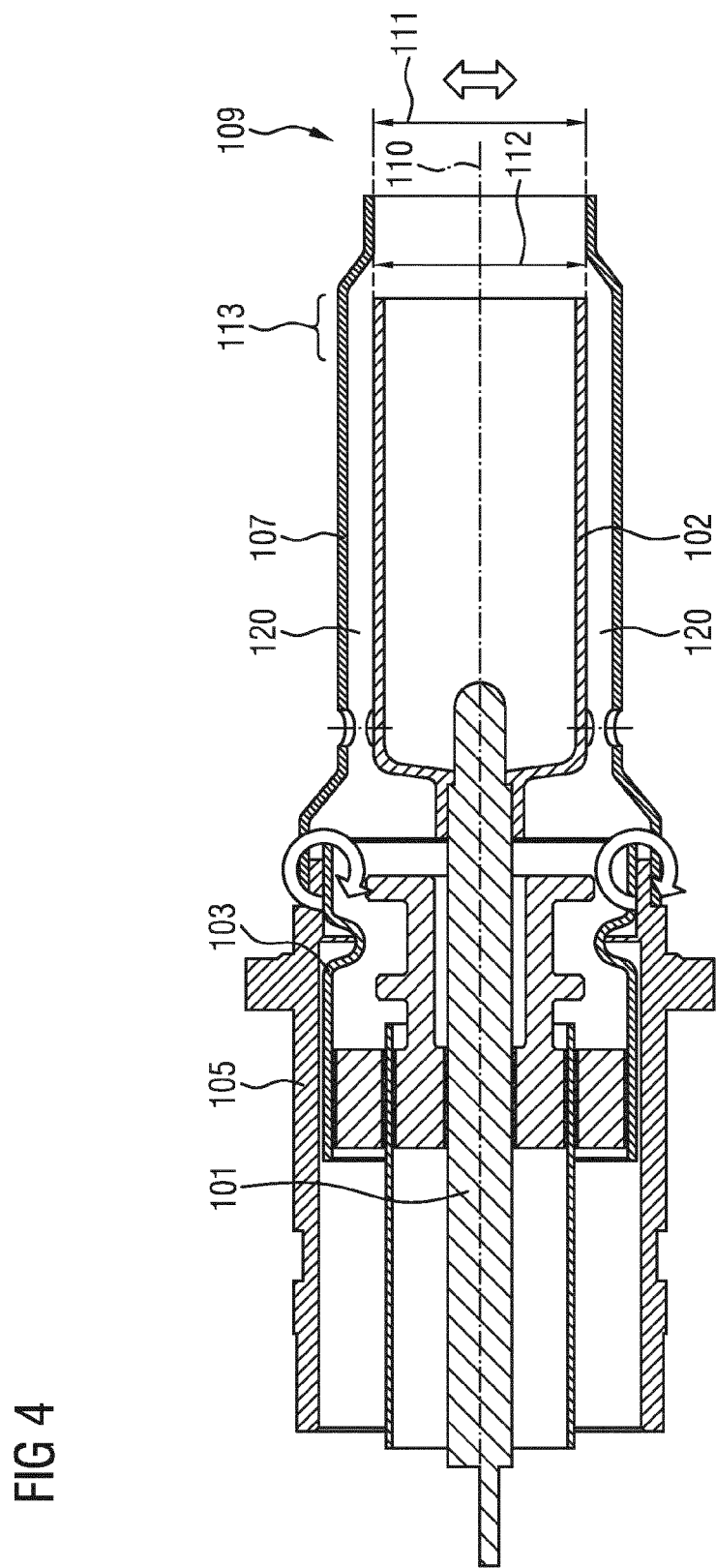
FIG. 4 shows a schematic illustration of a sectional view of a part of the sensor during the production of one embodiment.

FIG. 4 shows a schematic illustration of a sectional view of a part of the sensor 100 during a further step in the production method. A cathode sleeve 107 is fitted onto the housing 105. The cathode sleeve 107 extends with an elongate extent along the longitudinal axis 110. The cathode sleeve 107 is fitted onto the housing 105 such that the cathode sleeve 107 surrounds the anode sleeve 102 along the longitudinal axis 110. A circumferential gap 120, in particular an air gap, is formed between the cathode sleeve 107 and the anode sleeve 102. The cathode sleeve 107 has an internal diameter 111 at an end 109 facing away from the housing 105. The internal diameter 111 is greater than or equal to an external diameter 112 of the anode sleeve 102. Consequently, the anode sleeve 102 and the cathode sleeve 107 can be aligned as coaxially as possible with respect to one another even in the end region 113 and respectively at the end 9, for example by means of a gauge. The housing 105 serves as a receptacle for the cathode sleeve 107. The anode sleeve 102 is aligned as coaxially as possible with respect to the housing 105. Consequently, the cathode sleeve 107 is also aligned as coaxially as possible with respect to the anode sleeve 102. An exact and constant gap 120 along the longitudinal axis 110 is made possible as a result. The cathode sleeve is subsequently connected, for example welded, to the housing.

FIG. 5 shows a schematic illustration of a sectional view of the sensor 100. A protective sleeve 115 is arranged above the cathode sleeve 107 in order to protect the sensor and in particular the gap 120. Openings 116 are provided in the protective sleeve 115. Openings 117 are provided in the cathode sleeve 107. A further opening 118 is provided in the protective sleeve 115. During operation, the exhaust gas flows through the openings 116, 117, 118 and thus through the gap 120. An electric field is applied between the anode sleeve 102 and the cathode sleeve 107, said electric field varying depending on the concentration of soot particles in the exhaust gas. Consequently, it is possible to measure the concentration of soot particles in the exhaust gas by means of the sensor 100. By way of example, the sensor 101 is arranged downstream of a soot particle filter in a motor vehicle and serves for checking whether the soot particle filter sufficiently filters soot particles out of the exhaust gas.

The sensor 100 comprises the anode sleeve 102 and the cathode sleeve 107, which are configured as coaxial hollow cylinders. By way of example, the anode sleeve 102 and the cathode sleeve 107 are each formed from a high-grade steel. In the sensor 100, the insulator-metal composite of the assembly 108 is separated from the remaining components of the sensor 100. Consequently, it is possible to influence or to align the gap 120 by means of the mounting device. Consequently, the production of the sensor 100 is less dependent on high-precision components. The insulators 104 and the optional metallic inner sleeve 114 are pre-mounted and soldered in the separate adapter sleeve 103. In this case, the tip of the anode conductor 101, or the region 119, is soldered as coaxially as possible with respect to the adapter sleeve 103. This is possible very precisely by means of a soldering gauge. By virtue of the separation from the housing 105, the soldering assembly 108 remains small and handy and thus increases productivity in the time-intensive soldering process.

The assembly 108 is subsequently placed into the housing 105 and the tip of the anode conductor or the region 119 is aligned coaxially with respect to the housing 105 by means of a further device. This is carried out by means of a slight tilting of the adapter sleeve 103 in the housing 105. The assembly 108, in particular the adapter sleeve 103 and the housing 105 are subsequently welded to one another.

The tip of the anode conductor 101 or the region 119 serves as a receptacle for the anode sleeve 102. The tip of the anode conductor 101 is aligned as coaxially as possible with respect to the housing 105 and, consequently, the anode sleeve 102 is also aligned as coaxially as possible with respect to the housing 105. The housing 105 serves in turn as a receptacle for the cathode sleeve 107, which thus analogously thereto is also aligned as coaxially as possible with respect to the anode sleeve 102. Consequently, a maximally homogeneous, circumferential gap 120 between the anode sleeve 102 and the cathode sleeve 107 is possible.

For mounting the cathode sleeve 107, one end may be fitted onto the housing 105. The opposite end 109 is shaped in such a way that the internal diameter 111 is greater than or equal to the external diameter 112 of the anode sleeve 102. Consequently, it is possible to insert an alignment gauge into the cathode sleeve 107 and to align the anode sleeve 102 and the cathode sleeve 107 relative to one another. The cathode sleeve 107 and the housing 105 are shaped at least in the common contact region such that the cathode sleeve 107 can be tilted relative to the housing 105. Consequently, an alignment relative to the anode sleeve 102 is possible. After the as precise coaxial alignment as possible, the cathode sleeve 107 is fixedly welded to the housing 105. Consequently, over the entire air gap there is a maximally uniform and circumferential spacing 125 between the cathode sleeve 107 and the anode sleeve 102. Afterward, if appropriate, the protective sleeve 115 is mounted in order to protect the air gap 120.

In the sensor 100, the elements that are connected to one another by means of soldering are separated from the customary components. Consequently, individual component tolerances and production tolerances are only of secondary importance in the overall system of the sensor 100. It is thus possible to produce a constant gap 120 and thus during operation a constant electric field independently of the long tolerance chains as a result of the individual components.

Various joining techniques can be used to join together insulators and the conductive parts, for example ceramic-metal, glass-metal, metallized ceramic-ceramic, ceramic-glass, metal-steatite etc. The production tolerances that occur in these joining techniques are subsequently compensated for as far as possible by the alignment relative to the housing 105. The individual components can be manufactured expediently and without high-precision tolerances since it is subsequently possible to compensate for the tolerances.

The assembly 108 may be small and compact and hence more units can be soldered simultaneously. Consequently, an improvement in productivity is possible. The rejects in the case of instances of incorrect soldering or instances of incorrect joining can be reduced since the housing 105 is not mounted until later.

In some embodiments, the material of the adapter sleeve 103 is optimized with regard to its coefficient of thermal expansion as a link between the housing 105 or the rest of the sensor 100 and the material of the insulator 104. Consequently, reduced loading of the metal-insulator composite is possible since stresses can be taken by the adapter sleeve 103. The construction of the sensor 100, in particular of the anode sleeve 102 and the cathode sleeve 107, is such that the possibility of the alignment and/or monitoring of the anode sleeve 102 is made possible by the accessibility of the alignment gauge.

What is claimed is:

1. A sensor for a motor vehicle, the sensor comprising:
a housing:
an adapter sleeve arranged in the housing;
an anode conductor arranged in the adapter sleeve;
wherein the anode conductor is rigidly connected to the adapter sleeve by an electrical insulator;
an electrically conductive anode sleeve connected to the anode conductor and extending beyond the housing in a longitudinal direction;
an electrically conductive cathode sleeve connected to the housing;
wherein the anode sleeve is arranged at least partially within the cathode sleeve; and
wherein the anode sleeve and the cathode sleeve are arranged coaxially with respect to one another within the scope of the production tolerances.

2. The sensor as claimed in claim 1, wherein the adapter sleeve is welded to the housing.

3. The sensor as claimed in claim 1, wherein the adapter sleeve, the anode conductor, and the insulator form an assembly physically distinct from the housing.

4. The sensor as claimed in claim 1, wherein the adapter sleeve, the anode conductor, and the insulator are connected to one another by solder.

5. The sensor as claimed in claim 1, wherein the adapter sleeve comprises a metal with a coefficient of thermal expansion corresponding to a coefficient of thermal expansion of the insulator within a predefined tolerance range.

6. The sensor as claimed in claim 1, wherein the cathode sleeve includes, at a first end facing away from the housing, an internal diameter greater than or equal to an external diameter of the anode sleeve in an end region facing away from the housing.

* * * * *